May 4, 1937.    R. LAPSLEY    2,079,513
PROCESS FOR PRODUCING CLUTCH TEETH
Filed Jan. 10, 1935    4 Sheets-Sheet 1

Inventor:
Robert Lapsley
By:
Attys.

May 4, 1937.    R. LAPSLEY    2,079,513
PROCESS FOR PRODUCING CLUTCH TEETH
Filed Jan. 10, 1935    4 Sheets-Sheet 2
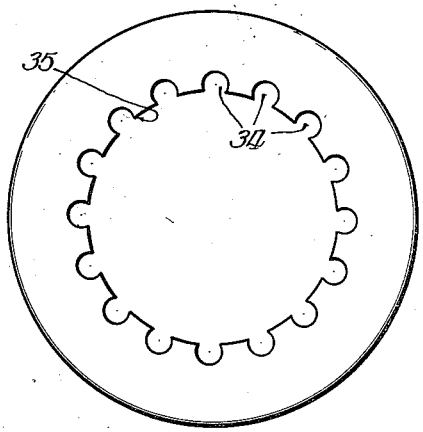
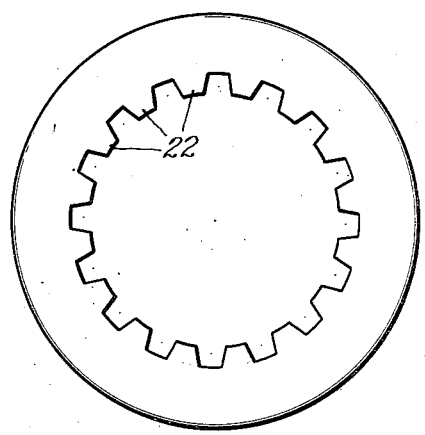
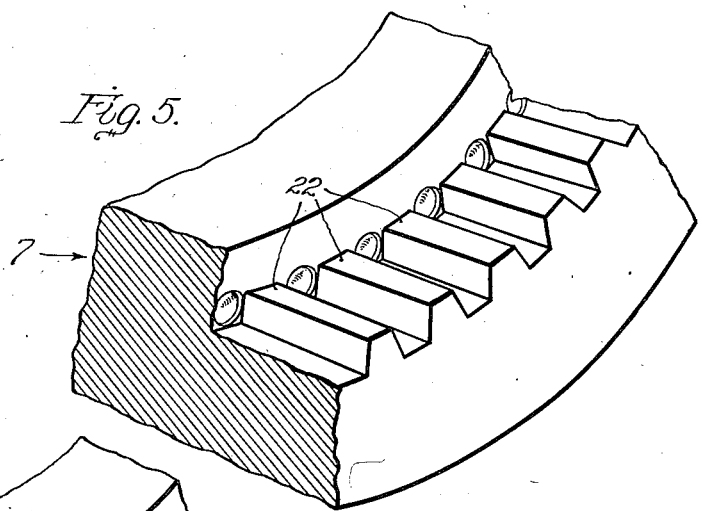
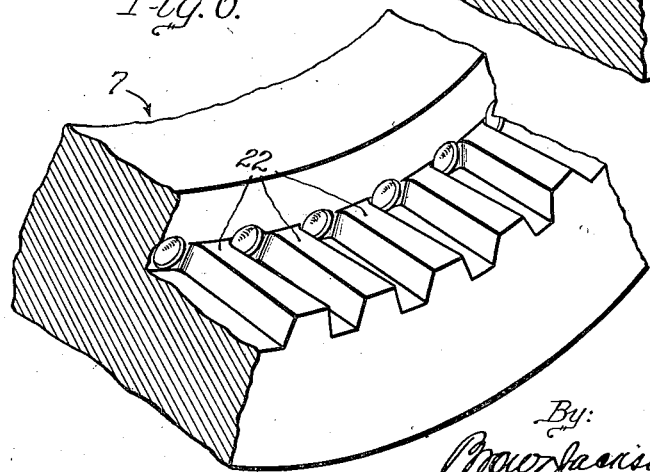
Inventor:
Robert Lapsley
By:
Attys.

May 4, 1937. R. LAPSLEY 2,079,513
PROCESS FOR PRODUCING CLUTCH TEETH
Filed Jan. 10, 1935 4 Sheets-Sheet 3

Inventor:
Robert Lapsley
By:
Attys.

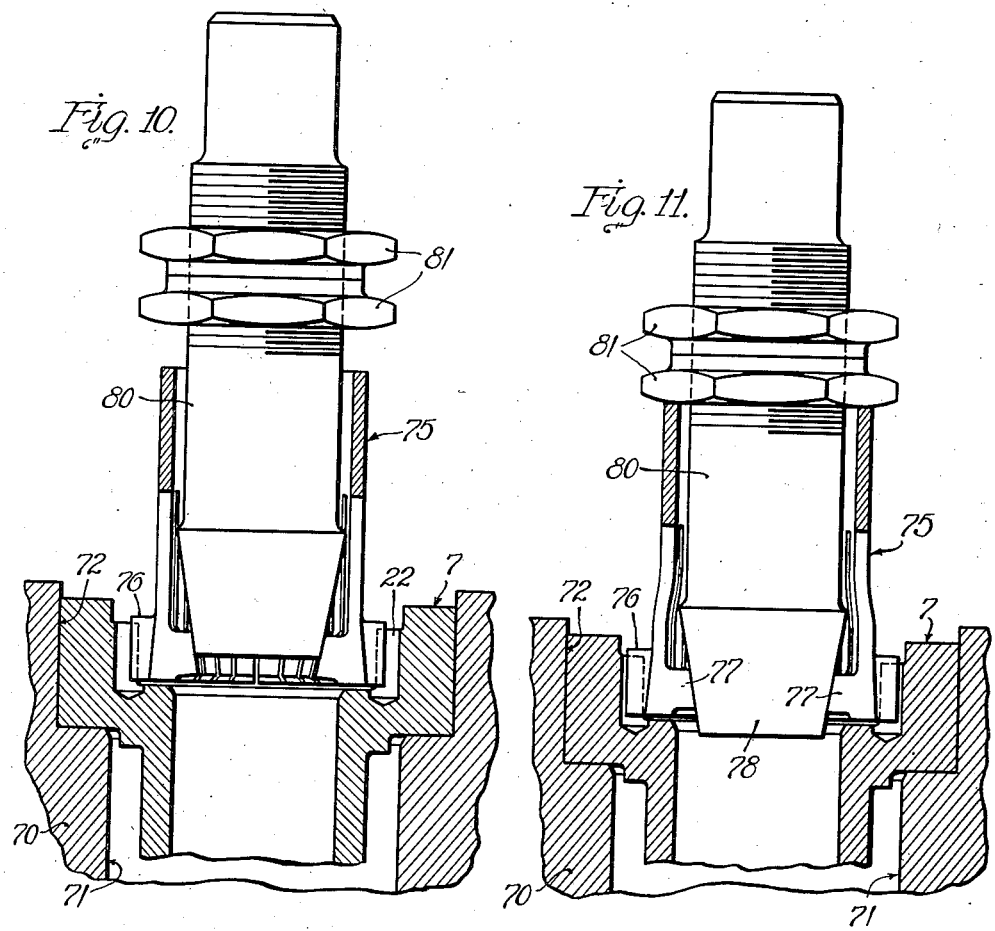
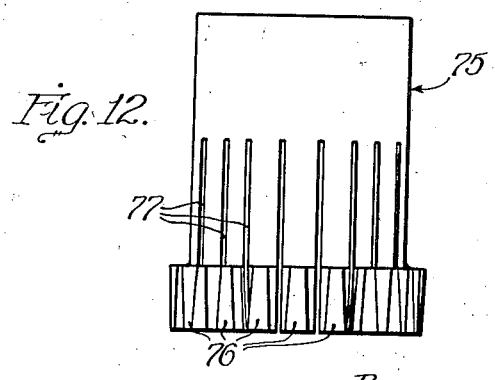

Patented May 4, 1937

2,079,513

UNITED STATES PATENT OFFICE 2,079,513

PROCESS FOR PRODUCING CLUTCH TEETH

Robert Lapsley, Berrien Springs, Mich., assignor to Clark Equipment Company, Buchanan, Mich., a corporation of Michigan Application January 10, 1935, Serial No. 1,197

8 Claims. (Cl. 29—159.2)

The present invention relates generally to gear cutting and similar operations and is more particularly concerned with a new and improved process for producing clutch teeth, such as those used on the gear members of an automobile transmission with which the slidable clutch hub is associated, although the present invention is obviously not limited to the production of teeth of this type or service.

In the conventional automobile transmission in use at the present time, a releasable coupling in the form of a positively acting jaw clutch is usually employed to effect a direct driving connection between the driving and driven shafts, and this type of coupling is also used to effect a driving connection between the driven shaft and certain of the gear members of one or more sets of constant mesh gearing used to effect a gear reduction in the transmission or, in some cases, an overdrive. In automotive and similar service, as well as in other services, the transmission mechanism is subjected to vibration and the like, and in some instances there has been an objectionable tendency for the clutch to disengage itself or otherwise jump out of mesh, with consequent interruption in the transmission of power. It is one object, therefore, of the present invention to provide clutch teeth of such form, and to produce these teeth quickly and inexpensively, that all tendency for the clutch parts to become disengaged accidentally is eliminated.

Specifically, it is the principal object of the present invention to provide clutch teeth of axially extending tapered formation arranged in such a manner that, when the clutch parts are moved into engagement, the clutch teeth interlock by virtue of the interengaging tapered sections so that there is no possibility of the clutch members disengaging themselves.

A further object of the present invention is to form internal gear teeth of tapered formation by the use of a coining tool or the like which forces the clutch teeth to take the proper shape by pressure while both the work and the tool are rolled or rotated together in the proper relation.

A further object of the present invention is the provision of a method of forming tapered clutch teeth and other teeth of irregular form by the use of a coining gear having tooth portions adapted to be forced in between the spaces of the clutch teeth for shaping the latter to the desired form.

A further object of the present invention is the production of tapered clutch teeth by first cutting the teeth as spur gear teeth or some other simple form and then coining or rolling the teeth with a suitable coining tool to produce the desired tooth form.

An additional object of the present invention is to perform the above operations by the use of standard machines.

These and other objects of the present invention will be apparent to those skilled in the art after a consideration of the following detailed description of the preferred structural embodiments, taken in conjunction with the accompanying drawings illustrating such embodiments.

In the drawings:

Figures 2 and 3 illustrate preliminary operations prior to broaching straight internal teeth in a gear member;

Figure 4 illustrates the step of broaching straight teeth in the gear member;

Figure 5 is a fragmentary perspective of the internal portion of the transmission driving gear shown in Figure 1 and illustrating the shape of the internal clutch teeth after the above mentioned operations have been performed;

Figure 6 is a view similar to Figure 2 but showing the shape of the teeth in their finished form after the coining operation;

Figures 10 and 11 illustrate another method of shaping tapered clutch teeth by pressure; and Figure 12 is a side view of the coining tool employed in carrying out the process illustrated in Figures 10 and 11.

Figure 1:
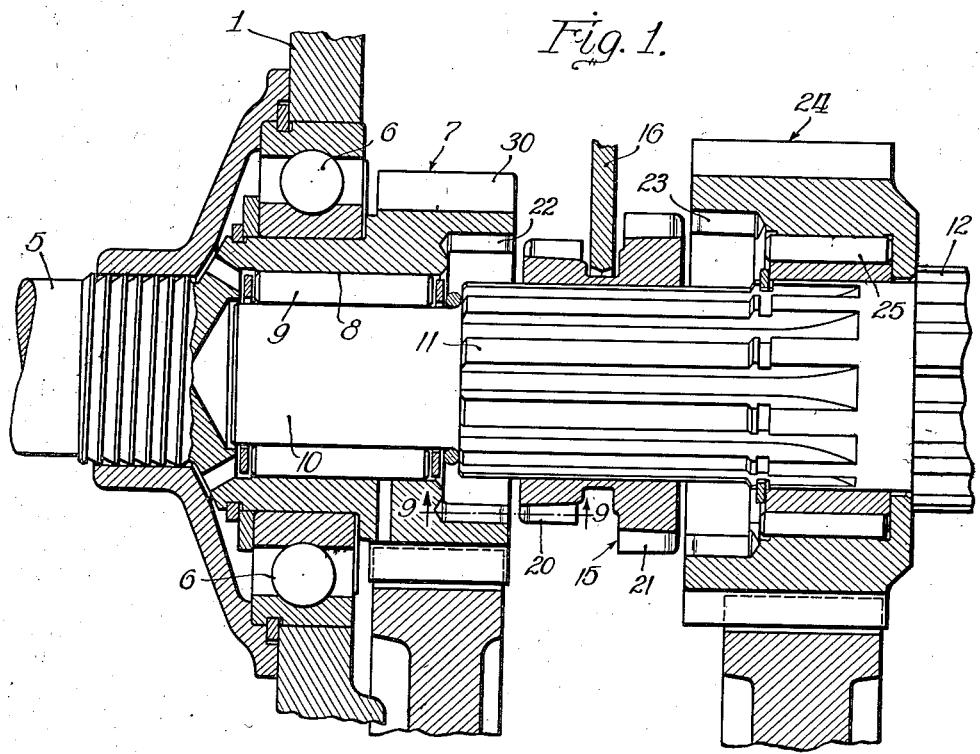
Figure 1 illustrates a portion of an automobile transmission employing gear members constructed in accordance with the principles of the present invention.

Referring now to the drawings, particularly Figure 1, it will be observed that the portion of the transmission illustrated in this figure is more or less of conventional construction, being a transmission similar to that disclosed in my copending application, Serial No. 723,450, filed May 2, 1934, and embodying a main transmission housing 1 having front and rear walls in which the countershafts and the driving and driven shafts are journaled. The driving shaft is indicated by the reference numeral 5 and is supported by bearings 6 in the front wall of the casing 1 and includes a driving gear 7 which has a suitable recess 8 to receive bearing means 9 by which the forward end of the driven shaft 10 is piloted. The driven shaft 10 is splined in two sections 11 and 12, the forward splined section 11 being of smaller diameter than the section 12 and having slidably mounted thereon a shiftable clutch hub 15 controlled by a shift fork 16 of the usual construction. The shiftable hub member or clutch dog 15 is equipped with two sets of teeth 20 and 21 engageable, respectively, with internal teeth 22 formed on the driving gear 7 and internal teeth 23 carried by a gear member 24 which is rotatably mounted, as by suitable bearing means 25, on the driven shaft 10 between the splined sections 11 and 12. The present invention is not concerned with the details of the transmission gears as such but is principally concerned with the method of producing the clutch teeth 22 and 23 on the gear members 7 and 24.

As mentioned above, in order to eliminate any tendency for the shiftable clutch hub 15 to jump out of mesh, either with the driving gear 7 or the constant mesh gear 24, the clutch teeth 20, 22 and 21, 23 are tapered (see Figure 9), and the means and methods by which the clutch teeth are brought to the proper shape will now be described.

Figure 2:
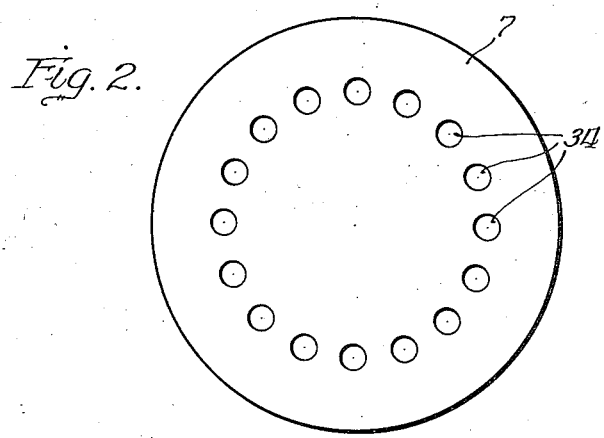

Referring first to Figures 2, 3, and 4, the first step is to drill a number of equally spaced holes 34 in the gear blank 7, as indicated in Figure 2, and next the gear blank is bored out, as at 35 in Figure 3, with the diameter of the boring tool sufficient to reach the openings 34 drilled in the previous operation. The next step is to form the teeth 22 (Figure 4) according to standard practice, as by broaching or the like, which shapes the teeth 22 as for spur gearing; that is, the elements of the faces and flanks of the several teeth are parallel. Figure 5 is a fragmentary perspective of the gear 7 in which the straight broached teeth 22 are shown.

After the gear 7 of the teeth 22 is shaped as shown in Figure 5, the next step is to form the desired taper in the teeth. This is done by mounting the gear 7, and the shaft 5, in case the latter is formed integral with the gear 7, on the work spindle of a milling machine, or the work spindle carrying the gear 7 may be mounted upon the cross slide of a lathe or a similar machine. In either case, the gear 7 is mounted in this fashion while the gear is soft, that is, it has not been hardened, and, in addition, the gear is mounted so that the same can be rotated about its own axis and can furthermore be fed in a direction transverse to its axis of rotation. Preferably, the gear 7 does not at this time have its external teeth, indicated in Figure 1 by the reference numeral 30, cut at this time, these teeth being cut after the internal gear or clutch teeth have been finished, as will be referred to later.

Figure 7:
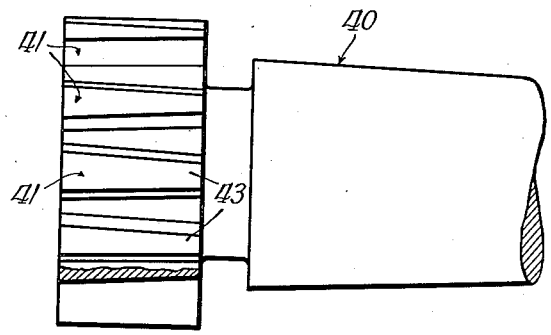
Figure 7 is a side view of the hardened coining or rolling tool.
Figure 8:
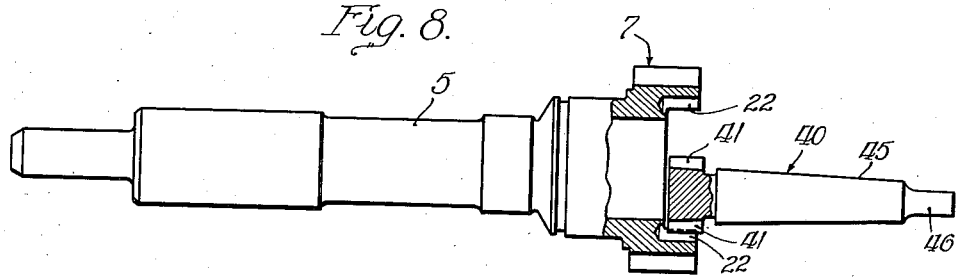
Figure 8 illustrates the relation between the work and the tool during the coining or rolling operation.

The teeth 22 are then given a final form by a rolling or coining gear, one form of which is indicated in Figures 7 and 8 by the reference numeral 40. The tool 40 is hardened and is provided with teeth 41 tapered to have a wide outer end 42 and a narrow inner end 43, the taper being proportioned according to the amount of taper it is desired that the clutch teeth 22 shall have. The form and proportion of the taper teeth 41 on the tool 40 are substantially the same as the tooth form of the companion clutch or gear member 15 which is adapted to cooperate with the gear 7, the teeth 20 of the member 15 being substantially of the same form as the coining teeth 41 of the rolling tool 40. The tool 40 is adapted to be held in, secured to, or arranged to serve as, the tool spindle of a milling machine or lathe, or any similar machine tool, the tool 40 preferably having a tapered shank 45 and a tongue 46 for this purpose. Mention was made above to the fact that the soft part, that is, the gear 7, is held in a work spindle and can be fed transversely. In this case, where the work is fed, the hardened rolling tool or coining gear is mounted only for rotation, but it is to be understood that the work might be mounted for rotation and the tool mounted for both rotation and transverse movement by which it may be fed into the work.

In rolling or coining the taper in the clutch teeth 22, the machine is started with the rolling tool in about the position shown in Figure 8, with the tapered teeth 41 started in between the teeth 22 in the tooth space therebetween, but not bottoming therein, with the wider or thicker tooth portions 42 adjacent the inner ends of the clutch teeth 22. The next step is to start the rolling or coining tool rotating, and this will cause the gear 7 to also rotate. Next, the position of the work spindle is adjusted in order to feed the work against the rolling tool 40, thereby forcing the teeth 41 of the latter to press against the clutch teeth 22. With a feed at the proper rate, the rotation of the tool 40 and the gear 7 will cause the teeth 41 to coin the clutch teeth so that they will have a taper with the narrow portion adjacent the inner ends and the wider or thicker portions at the outer ends, as best shown in Figure 6.

After the teeth 22 have been brought to the proper shape by the operation of the rolling or coining gear 40, the gear 7 is removed from the work spindle of the machine tool and the external teeth 30 can then be cut therein. These teeth may be helical, or they may be spur teeth, or of any other shape desired. One advantage of coining the taper in the clutch teeth 22 before the external teeth 30 are formed is that the integrality of the outer portions of the gear blank serves to prevent any distortion of the peripheral portion thereof due to the action of the coining or rolling gear tool. If the teeth 30 were cut before the clutch teeth 22 were tapered, the external teeth might become distorted during the coining operation.

In Figures 6 and 7, the taper of the teeth 22 and 41 has been somewhat exaggerated in order to best illustrate the principles of the present invention. In practice, however, I prefer to employ a taper in the order of 0.002 inch in 3/8 inch but it is understood, of course, that any degree of taper may be provided as desired. I have found, however, that this relatively small amount of taper is ample to cause the clutch teeth on the gear 7 and the clutch hub 15 to interlock so that there is no danger of the clutch hub accidentally becoming disengaged from the gear 7. Also, by virtue of the relatively small amount of taper, the flow of metal during the rolling or coining operation is relatively small, the action of the coining gear 40 serving in general to apply pressure to the teeth 22 laterally of their length to bring them to the desired taper. When the clutch teeth are cut as in standard practice (Figures 2 to 5), the root diameter of the teeth 22 is such that the flow of metal occurring during the shaping of the teeth is rolled or coined into the clearance between the outside diameter of the rolling or coining gear 40 and the root diameter of the internal teeth 22. In this way, excessive pressures in the feeding operation are not required in order to bring the teeth 22 to the proper shape, since no work is done by the tops of the coining teeth 41.

Figure 9:
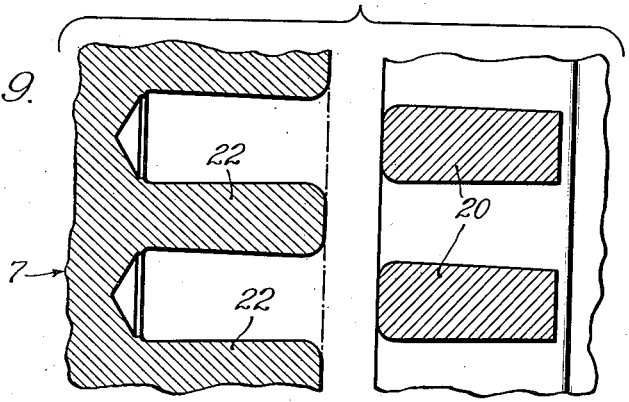
Figure 9 is a developed section, taken along the line 9—9 of Figure 1, illustrating the relation between the tapered teeth formed on the two companion clutch parts.

The present invention is not concerned with the manner or means by which the tapered teeth 41 in the coining or rolling tool 40 are formed. The teeth 41 may be cut or shaped in any manner desired, but it is to be observed that the teeth 41 on the coining tool are of substantially the same form as the teeth 20 and 21 on the slidable clutch hub 15, the only difference being that the teeth on the rolling tool must be so shaped that the narrow tooth space 50 as formed by the narrow portions 43 of the coining teeth must be of sufficient dimension to permit the wider tooth portions 20a of the slidable clutch hub teeth 20 to enter therein, as is indicated in Figure 9, with sufficient clearance to permit a ready engagement and disengagement of the slidable clutch hub 15 with the gear 7 by axial sliding movement of the clutch hub member 15. By virtue of this construction, therefore, the space between the internal clutch teeth is narrower at its outer end than at the inner end, while the mating gear, i. e., the slidable clutch hub 15, is tapered to correspond, so that when shifted into engagement, the widest part of the external clutch teeth 20 are in engagement with the narrow part of the internal clutch teeth 22. The clutch teeth are therefore interlocked together, so that, when under load, these parts cannot be accidentally disengaged, due to the taper resisting the tendency to move out of engagement.

The teeth 23 on the constant mesh gear member 24 are formed in a manner similar to that described above for the clutch teeth 22, and hence a repetition of the operations is unnecessary. Also, the teeth 21 on the rear end of the slidable clutch hub 15 are formed in the same manner as the teeth 20, this being, in most practical installations, in the same manner in which the teeth of the coining or rolling tool 40 are formed and, as such, are not a part of the present invention.

Figures 10 and 11 show another method of coining the taper into the tapered internal clutch teeth, employing pressure but without rotating either the tool or the work. Referring now to Figures 10 and 11, the gear 7 is, in this case, disposed in a holding fixture 70 having a bore 71 to receive the driving shaft 5 and a larger bore 72 formed to closely fit the outside diameter of the gear 7 before the teeth 30 are cut. As in the modification described above, the external teeth 30 are not cut on the gear blank 7 until after the internal clutch teeth 22 thereof have been brought to the proper taper. Also, as in the previous form, the internal clutch teeth 22 are preliminarily formed as in standard practice with faces having parallel elements.

After the gear 7 has been disposed in the holding fixture 70 with its outer peripheral portion fitting in the bore 72, a coining gear 75 in the nature of a spring collet is disposed with each of its teeth 76 disposed between the preliminarily formed clutch teeth 22. The coining gear 75 is best shown in Figure 12, and it will be observed that the coining gear 75 is provided with its teeth 76 tapered and of practically exactly the same shape and proportion as the teeth of the clutch hub 15 to be used with the gear 72 when finished. The teeth 76 of the coining gear 75 are tapered with the wider or thicker tooth portions disposed outwardly and the narrow portions are disposed inwardly of the tool. Between each pair of adjacent teeth there is a slot 77 to provide for the radial expansion and retraction of the coining gear teeth 76. The interior of the coining gear 75 adjacent the portions in which the coining gear teeth 76 are formed are provided with thickened tapered or conical sections 77 adapted to receive the tapered end 78 of an arbor 80. The other end of the arbor 80 is adapted to be connected to the ram of a press or similar machine.

In operation, the gear 7, before the same is hardened, is placed in the holding fixture 70, and then the coining gear 75 is disposed with its teeth 76 in between the teeth 22 of the gear 7. The ram of the press carrying the arbor 80 is then brought down so that the tapered end 78 begins to enter the tapered sections 77 of the coining gear. Next, the ram of the press is forced downwardly so that the tooth portions 76 of the coining gear will be forced radially outwardly between the sides, that is, the faces and flanks, of the clutch teeth 22. This will form tapered teeth of the shape desired in the member 7. After this operation is completed, the arbor is withdrawn from the coining gear 75 and the latter is removed from the gear 7, permitting the latter to be removed from the bore 72 in the holding fixture of the press.

In this form of the present invention, as in the preceding form, the teeth of the coining gear are of substantially the same shape as the teeth of the part with which the gear 7 operates. However, where the coining gear 40 as described above is substantially smaller than the slidable clutch hub 15, preferably in Figures 10 and 11 the coining gear 75 is, before expansion (Figure 10), slightly smaller than the clutch hub which works with gear 7 and, after expansion by the arbor 80 (Figure 11), slightly larger than the clutch hub. As a result of this arrangement, Figure 12, in its normal or unbiased position the outside diameter of the coining gear teeth is reduced, as compared with the root diameter of the teeth 22, by slightly more than the amount that the coining gear 75 is to be expanded, so that, even when expanded, there will be a clearance between the outside diameter of the coining gear teeth and the root diameter of the clutch teeth 22. Thus, the outside diameter of the coining gear does not perform any of the coining, since it is desired to form or shape only the tapered sides of the clutch teeth 22, as in the previously described embodiment. If, for example, the coining gear teeth were caused to press against the material of the gear 7 at the root diameter of the clutch teeth 22, excessive pressure would be required, and this would tend to cause distortion of the gear.

Figure 10 shows the position of the coining gear teeth before the coining gear has been expanded, and Figure 11 shows the position of the coining gear 75 after the ram 80 has forced the tapered section 78 down in between the portions 77 of the coining gear, and it is to be noted that in this position the outside diameter of the coining gear teeth 76 is slightly greater than the outside diameter of the slidable clutch part adapted to operate with the finished clutch teeth 22. The expansion of the coining gear 75 is carried far enough so that an additional diameter is provided to allow the finished parts to be slipped together easily, and after the internal clutch teeth 22 of the gear 7 have been finished, the gear is removed from the holding fixture and the external teeth 30 formed therein in the usual manner.

The arbor 20 is preferably provided with a pair of adjusting nuts 81 disposed in such a position as to engage the upper end of the coining gear 75 for the purpose of limiting the amount of expansion of the coining gear teeth 76.

The above described processes have been set forth as embodied in the formation of the tapered clutch teeth for the gear 7, but it is to be understood that my invention contemplates employing the same process in forming the tapered internal clutch teeth 23 carried by the gear 24 (Figure 1).

Thus, while I have described above the preferred embodiment of the present invention, it is to be understood that my invention is not to be limited to the particular details and steps set forth above but that, in fact, widely different means and methods may be employed in carrying out the broader aspects of my invention. For example, the diameter of the coining gear could be substantially the same as the spring collet 75 shown in Figure 10, and, likewise, the present invention contemplates carrying forward the operation illustrated in Figure 8 until the finished clutch parts can be slipped into and out of engagement, as illustrated in Figure 9.

What I claim, therefore, and desire to secure by Letters Patent is:

1. The method of producing internal interlocking clutch teeth on a member, which method comprises first machining said clutch teeth so that the tooth thickness is substantially the same from one end to the other, inserting a tool having tapered teeth into mesh with said clutch teeth, and forcing said tapered teeth in between said clutch teeth with a pressure sufficient to change the shape of each tooth from a uniform thickness to a shape in which the tooth thickness at their outer ends exceeds that at the inner ends.

2. The method of forming internal and external teeth on a gear blank which comprises first forming internal spur gear teeth while the blank is soft, changing the shape of the teeth from spur teeth to tapered teeth by applying substantially radially directed pressure to the teeth by a hardened coining tool having teeth of the shape required for the member which operates with said internal teeth, utilizing the uncut external portion of the gear blank to prevent distortion of the gear blank due to the radially directed pressure, and then cutting the external teeth in said external portion of the gear blank after the internal teeth have been tapered.

3. The method of producing a member with internal gear teeth, which comprises cutting said internal teeth to approximate size and proportion before the member has been hardened, inserting the teeth of a coining gear in between said internal gear teeth, and then forcibly expanding the toothed portion of said coining gear radially outwardly to simultaneously bring all of said internal gear teeth to the desired form.

4. The method of forming tapered internal gear teeth in a blank, which comprises cutting the teeth while soft to their full depth and with approximately straight faces and uniform thickness, confining the radially outer portion of said blank against radially outward displacement, and then completing the formation of the teeth by wedging the tapered teeth of a coining gear in between said gear teeth in a radially outward direction, thereby utilizing the outer diameter of the blank and the confining means to resist the radially outwardly directed forces and thereby prevent distortion of the blank during the wedging operation.

5. The method of producing a member with internal teeth, which comprises cutting said internal teeth to approximate size and proportion before the member has been hardened, confining the radially outer portion of the member against radially outward displacement, inserting the teeth of a coining gear in between said internal teeth, and then forcibly expanding the toothed portion of said coining gear radially outwardly to simultaneously bring all of said internal teeth to the desired form.

6. The method of producing internal interlocking clutch teeth on a clutch member that is engaged with and disengaged from an externally toothed clutch member by axial movement of one with respect to the other, which method comprises first machining said clutch teeth so that the tooth thickness is substantially the same from one end to the other, inserting a tool having tapered teeth into mesh with said clutch teeth, and forcing said tapered teeth in a radial direction in between said clutch teeth with a pressure sufficient to change the shape of each tooth from a uniform thickness to a shape in which the tooth thickness at the outer end exceeds that at the inner end.

7. The method of producing a member with both internal and external gear teeth, which comprises cutting said internal teeth to approximate size and proportion before the member has been hardened, inserting the teeth of a coining gear in between said internal gear teeth, and forcibly expanding the toothed portion of said coining gear radially outwardly to simultaneously bring all of said internal gear teeth to the desired form.

8. The method of producing internal interlocking clutch teeth on a clutch member that is engaged with and disengaged from an externally toothed clutch member for axial movement of one with respect to the other, which method comprises first machining said clutch teeth so that the tooth thickness is substantially uniform from one end to the other, inserting a tool having tapered teeth into mesh with said uniform clutch teeth, forcing the tapered teeth in a radial direction relative to said clutch member in between said uniform clutch teeth with a pressure sufficient to taper the latter, and confining the portion of said clutch member that is subjected to said radially directed pressure so as to prevent distortion of said member under said pressure.

ROBERT LAPSLEY.